US011808360B2

(12) United States Patent
Janko-Grasslober et al.

(10) Patent No.: US 11,808,360 B2
(45) Date of Patent: Nov. 7, 2023

(54) OIL SCRAPER RING FOR A PISTON ROD

(71) Applicant: Hoerbiger Wien GmbH, Vienna (AT)

(72) Inventors: Marian Janko-Grasslober, Vienna (AT); Martin Lagler, Vienna (AT); Andreas Kaufmann, Vienna (AT)

(73) Assignee: Hoerbiger Wien GmbH, Vienna (AT)

( * ) Notice: Subject to any disclaimer, the term of this patent is extended or adjusted under 35 U.S.C. 154(b) by 266 days.

(21) Appl. No.: 16/573,685

(22) Filed: Sep. 17, 2019

(65) Prior Publication Data

US 2020/0096104 A1    Mar. 26, 2020

(51) Int. Cl.
*F16J 9/20*    (2006.01)
*F02B 75/40*    (2006.01)

(52) U.S. Cl.
CPC .............. *F16J 9/203* (2013.01); *F02B 75/40* (2013.01)

(58) Field of Classification Search
CPC .................................. F16J 9/203; F02B 75/40
See application file for complete search history.

(56) References Cited

U.S. PATENT DOCUMENTS

| | | | | |
|---|---|---|---|---|
| 1,337,651 A | * | 4/1920 | Hartog | F16J 9/20 |
| | | | | 29/888.075 |
| 1,466,510 A | * | 8/1923 | Miller | F16J 9/206 |
| | | | | 277/462 |
| 1,477,120 A | * | 12/1923 | Hanson | F16J 9/20 |
| | | | | 277/461 |
| 1,710,485 A | * | 4/1929 | McKone | F16J 9/20 |
| | | | | 277/464 |
| 1,877,413 A | * | 9/1932 | Marshall | F16J 9/063 |
| | | | | 277/464 |
| 2,112,103 A | * | 3/1938 | Kottusch | F16J 9/203 |
| | | | | 277/924 |
| 2,319,454 A | * | 5/1943 | Hamm | F16J 9/203 |
| | | | | 277/462 |
| 3,124,502 A | * | 3/1964 | Radke | F16J 15/20 |
| | | | | 428/66.4 |
| 3,542,374 A | | 11/1970 | Neilson | |
| 4,128,250 A | * | 12/1978 | Barth | B23P 15/06 |
| | | | | 277/456 |
| 4,706,971 A | * | 11/1987 | Schirmer | F16J 15/56 |
| | | | | 277/548 |

(Continued)

FOREIGN PATENT DOCUMENTS

CN    205225624 U    5/2016
DE         560789 C    10/1932

(Continued)

*Primary Examiner* — Vishal A Patel
(74) *Attorney, Agent, or Firm* — Dykema Gossett PLLC

(57) ABSTRACT

A scraper ring is provided with a plurality of sealing sections on the radially inner circumferential surface, each including a scraping edge, wherein the sealing sections are spaced axially apart from each other by inner circumferential grooves, with at least one recess provided on the circumference of the scraper ring which extends at least partially from a first axial ring end to a second axial ring end and extends at least partially in a direction different from the axial direction of the scraper ring. At least one drainage opening is provided on the outer circumferential surface of the scraper ring, which is connected to at least one inner circumferential groove for removing scraped oil from the inner circumferential grooves.

16 Claims, 6 Drawing Sheets

(56) References Cited

U.S. PATENT DOCUMENTS

| | | | |
|---|---|---|---|
| 5,667,225 A | 9/1997 | Vollmer et al. | |
| 6,959,930 B2 * | 11/2005 | Wood | F16J 15/26 |
| | | | 277/434 |
| 9,027,934 B2 | 5/2015 | Lindner-Silwester et al. | |
| 9,500,280 B2 * | 11/2016 | Jenness | F02F 5/00 |
| 2011/0197756 A1 | 8/2011 | Hold et al. | |
| 2011/0197757 A1 * | 8/2011 | Hold | F16J 15/26 |
| | | | 92/168 |
| 2012/0211945 A1 | 8/2012 | Lindner-Silwester et al. | |
| 2013/0291716 A1 | 11/2013 | Ficht | |

FOREIGN PATENT DOCUMENTS

| | | | |
|---|---|---|---|
| DE | 19651112 A1 * | 6/1997 | F16J 9/066 |
| EP | 0473737 B1 | 9/1994 | |
| EP | 2570705 B1 | 4/2016 | |
| GB | 995683 | 6/1965 | |
| GB | 2298011 B | 1/1997 | |
| JP | S55-91741 A | 7/1980 | |
| JP | H04-506857 A | 11/1992 | |

\* cited by examiner

OIL SCRAPER RING FOR A PISTON ROD

CROSS-REFERENCE TO RELATED APPLICATIONS

This application claims the benefit of priority to Austria application No. A 50808/2018, filed 20 Sep. 2018.

BACKGROUND

The invention relates to a scraper ring for scraping oil from a translationally oscillating piston rod, having at least one outer circumferential groove provided on the radially outer circumferential surface for receiving an annular spring for radially pretensioning the scraper ring, wherein a plurality of sealing sections, each having a scraping edge, is provided on the radially inner circumferential surface of the scraper ring, wherein adjacent sealing sections are spaced axially apart from each other by an inner circumferential groove, wherein at least one recess radially penetrating the scraper ring is provided on the circumference of the scraper ring, which extends at least partially from a first axial ring end of the scraper ring to a second axial ring end of the scraper ring, in order to produce an adjustability of the scraper ring in the circumferential direction, at least in the region of a plurality of sealing sections on the first axial end of the scraper ring, wherein at least one drainage opening is provided on the outer circumferential surface of the scraper ring, which is connected to at least one inner circumferential groove, to remove scraped oil from the inner circumferential grooves. The invention also relates to a sealing pack and a piston compressor.

In large, relatively slow-running reciprocating engines in particular, such as, for example, natural gas compressors or large gas/or diesel engines, the so-called crosshead concept is predominantly used in the crank drive. The crosshead is a joint that couples a purely translationally oscillating piston rod connected to the piston with a combined translatory/rotationally oscillating push rod. The crosshead is rigidly connected to the piston rod and to the piston and is generally supported via a separate guide in the crankcase. The advantages of this concept are, for example, that a double-acting piston may be used, which works on two sides in the same cylinder, or that due to the spatial separation of cylinder and crankcase, different lubricants may be used for lubricating the piston and the crankshaft (in compressors also dry-running piston). Due to the purely translational movement of the piston rod, the piston is also free of lateral forces, which is why no piston tilting occurs at top dead center; the piston may thus be designed structurally simpler as compared to concepts involving a direct connection of the push rod to the piston.

In reciprocating compressors, lubricating oil for lubricating the moving parts of the reciprocating compressor, in particular of the crank drive, is generally located in the crankcase. In the process, the lubricating oil also passes to the piston rod and would be transported along the piston rod into the compression chamber in the cylinder, which is undesirable because on the one hand, this represents a significant oil leakage and an associated loss of oil. On the other hand, the lubricating oil would be partially removed with the compression medium and contaminate the latter. To avoid this, multiple so-called (oil) scraper rings are generally provided in the region of the piston rod, which are intended to scrape off the oil film on the piston rod. So-called oil scraper packs are often used, which include multiple oil scraper rings. For an improved scraping effect, multiple scraper rings per pack are generally required, which are supported by means of suitable support rings in order to avoid being damaged by the oscillating piston rod, in particular, being extruded into the gap between the piston rod and the scraper pack. Such designs are relatively complex and therefore cost-intensive. In addition, there is a limit in terms of size reduction due to the serial arrangement of multiple scraper rings with intermediate support rings, which is disadvantageous.

Scraper rings are often also installed in so-called sealing packs. A number of sealing rings is provided in a sealing pack, through which the connecting rod is passed and which seal the crankcase with respect to the compression chamber. Such sealing packs and sealing rings are sufficiently well known in a variety of designs.

Previously known scraper rings are, for example, metallic, radially cut rings having a sharp scraping edge, which surround and contact the piston rod in the circumferential direction. Such cut scraper rings are held together and activated by a circumferential annular spring on the circumference of the former, i.e., the annular spring generates a radial contact pressure to enable a proper functioning of the scraper ring. In order to seal the radial cuts, two radially cut rings are frequently used and situated offset relative to each other in the circumferential direction and secured against rotation. Arrangements comprising a radially and a tangentially cut scraper ring are also known. In some cases, when using two offset rings, only one scraping edge covers another, or if there are two scraping edges per ring, accordingly, only the two following scraping edges cover the gap of the first ring, which may lead to increased oil leakage. The additional manufacturing and assembly costs in the execution as an assembly having multiple rings, which must be secured against rotation relative to each other, represents an additional source of error of classic scraping solutions.

Conventional scraper rings typically include oil drainage holes and/or oil drainage grooves on their circumference to remove the stripped oil. These are often sized too small, however, which results in a damming or continuous wetting of the piston rod by the previously scraped lubricating oil, which reduces the scraping capacity of the next scraping edge.

Another problem with such metallic scraper rings is that the sharp scraping edge scratches against the piston rod and may damage it. Therefore, the scraping edge must also be manufactured with very exact manufacturing tolerances in order to prevent excessive damage to the piston rod. However, this increases the production costs of conventional scraper rings.

Scraper rings are often designed split in some way to allow for wear adjustment, to be able to compensate for thermal expansion, in order to be easily mountable on the piston rod and to be able to ensure a uniform scraping effect along the circumference of the piston rod. There are, however, also uncut scraper rings. However, these rings always suffer the problems of not being able to adjust to wear, or only to a limited extent, and of being unable to sufficiently compensate for thermal expansions due to different thermal expansion coefficients of the material of the piston rod and of the scraper ring.

U.S. Pat. No. 3,542,374. A sealing pack having a scraper ring is shown, for example, in WO 2010/079227 A1 or in EP 2 489 907 B1. Other oil scraper rings having one or more of the aforementioned disadvantages are known from EP 0 473 737 B1, DE 560 789 C, EP 2 570 705 A1, CN 205225624 U and GB 995,683. DE 195 05 404 B4 shows a sealing ring for rotating shafts.

SUMMARY OF THE INVENTION

Accordingly, it is an object of the subject invention to specify a scraper ring, which eliminates the aformentioned disadvantages. In particular, a reduction of the rings used per scraper pack is to be made possible and oil leakage into the cylinder is to be avoided. In addition, a sufficient removal of the scraped lubricating oil is to be made possible and superficial damage to the piston rod by the scraper ring is be avoided.

According to the invention, the object is achieved in that the at least one drainage opening extends in a groove shaped manner from the first axial ring end of the scraper ring partially in the direction of the second axial ring end and is connected to multiple inner circumferential grooves. As a result, the scraper ring according to the invention is able, depending on the number of sealing sections, to replace multiple separate scraper rings situated axially one behind the other. Since the sealing sections of the scraper ring are connected to each other, no separate anti-rotation means is required as in the case of separate scraper rings in the prior art. With the groove-shaped drainage opening, it is possible to improve the removal of oil and to simplify the manufacture of the scraper ring.

The recess extends preferably continuously from the first axial ring end to the second axial ring end of the scraper ring, wherein the scraper ring is completely interrupted at least once by the at least one recess. Because the scraper ring is interrupted at least once, a simple mounting of the scraper ring on the piston rod is made possible without having to detach the piston rod from the crosshead and the adjustability in the circumferential direction is improved, as a result of which wear of the scraper ring may be better compensated for.

Preferably, however, at least two recesses are provided, via which the scraper ring is completely interrupted at least twice, wherein the at least two recesses are preferably provided spaced apart from each other at constant angular distances on the circumference of the scraper ring. As a result, the scraper ring is divided into at least two ring segments, as a result of which the scraper ring may be more easily mounted on the piston rod. In addition, the wear adjustment is improved due to the at least two ring segments during continuous wear of the scraper ring, which results from the relative movement between the piston rod and scraper ring.

At least one recess preferably extends helically along the outer circumferential surface of the scraper ring, wherein the pitch of the helix is preferably between 0.1 and 10. This results in a continuous overlap of the sealing sections, which leads to a good scraping effect and to minimal leakage.

According to one advantageous embodiment, at least one recess extends in a stepped or labyrinth-shaped manner, wherein the recess preferably has at least three axially extending recess sections and preferably at least two circumferentially extending recess sections, which are arranged alternatingly. This further improves the oil scraping effect and reduces leakage.

At least two drainage openings are preferably provided on the outer circumference of the scraper ring. This ensures that a sufficiently large amount of lubricating oil may be removed from the inside radially outwardly.

Preferably at least one drainage opening extends helically, thereby improving the removal of lubricating oil.

If at least one drainage opening extends in parallel to the at least one recess, the drainage openings may be adapted to the profile of the recesses, as a result of which a uniform distribution of ring material on the circumference of the scraper ring may be achieved.

The scraper ring is preferably manufactured from plastic, thereby allowing for a simple manufacture and it is ensured that the surface of the piston rod is not damaged by the scraper ring.

The scraper ring may be advantageously manufactured by means of a machining process, preferably by means of milling and/or by means of a generative production method, preferably by means of 3D printing, selective laser sintering or stereolithography.

BRIEF DESCRIPTION OF THE DRAWINGS

The present invention is described in greater detail below with reference to FIGS. 1 through 8E, which show by way of example schematic and non-limiting advantageous embodiments of the invention. In the drawings.

DETAILED DESCRIPTION

Figure 1:
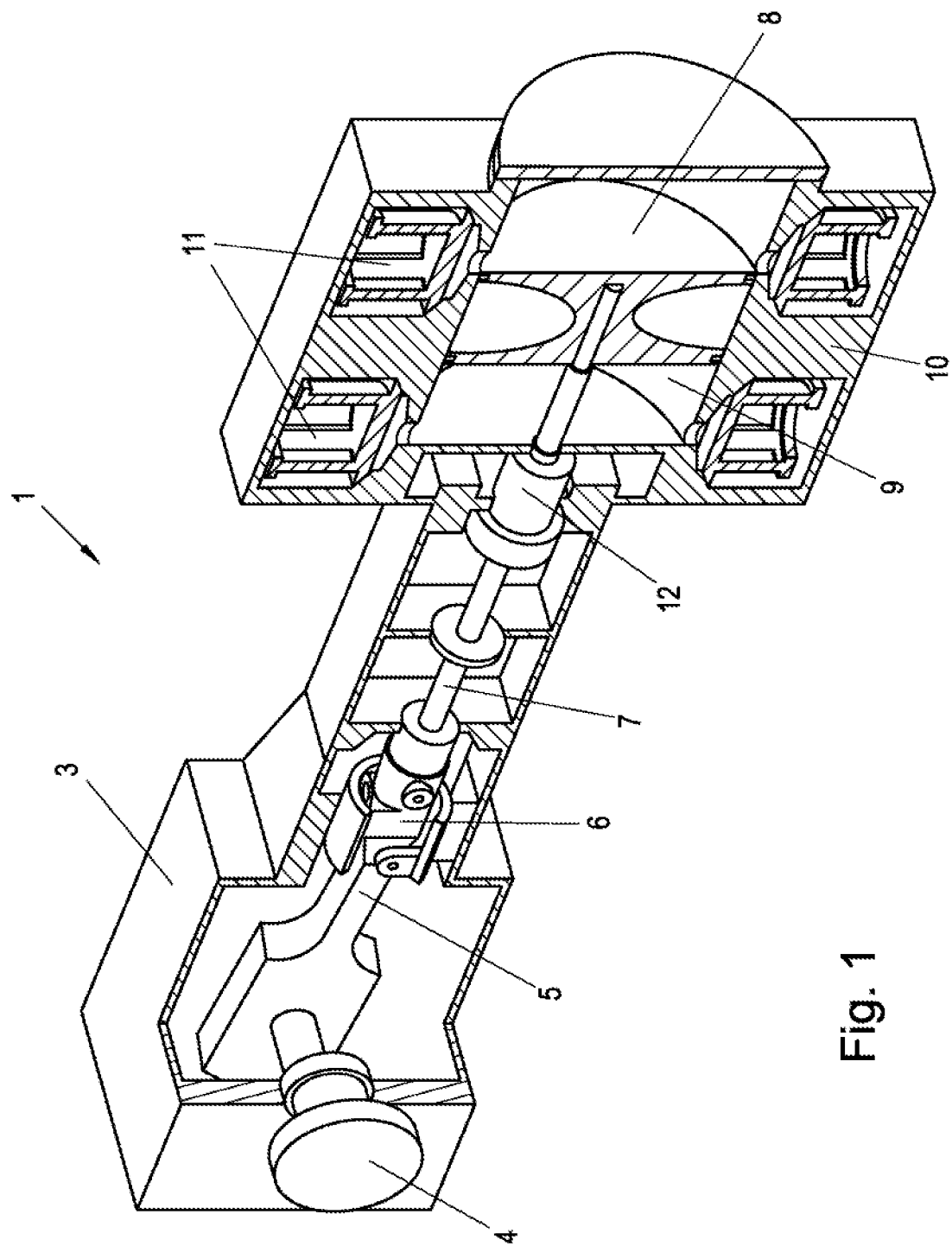
FIG. 1 shows a piston compressor.

FIG. 1 shows by way of example a piston compressor 1, in which the scraper ring 2 according to the invention (see FIG. 2) may be used. The piston compressor 1 includes a compressor housing 3 (crankcase) in which a crankshaft 4 is rotatably mounted. A push rod 5 is rotatably mounted at one end on a so-called crank pin (not shown) of the crankshaft 4 and rotatably mounted with the other end on a crosshead 6. The crosshead is axially movably mounted in the compressor housing 3 and is provided to support the lateral forces acting on the crosshead 6 due to the rotational and translational oscillation of the push rod 5 radially on the compressor housing 3. One end of a piston rod 7 is arranged on the crosshead 6, the opposite end is connected to a piston 8, which is arranged in a cylinder liner 9 of a cylinder 10. From the crosshead 6, only a translational movement is transmitted via the piston rod 7 to the piston 8, as a result of which the piston 8 performs an essentially purely translationally oscillating movement in the cylinder liner 9, without radial lateral forces acting on the cylinder liner 9. The piston compressor 1 in the example shown is designed as a double-acting compressor, which means that compression work is performed in the cylinder 10 on both axial sides of the piston 8. A single-acting compressor could, of course, also be used or another piston engine such as an internal combustion engine. Radially outerlying suction and pressure valves 11 are provided on the cylinder 10, which are provided for supplying a medium to be compressed into the cylinder 10 (suction valve) and for removing a compressed medium from the cylinder 10 (pressure valve). The suction and pressure valves 11 may, of course, also be designed differently and may also be situated elsewhere.

A sealing pack 12 is generally provided between cylinder 10 and compressor housing 3, which serves to seal the high pressure in the cylinder with respect to the relatively lower pressure in the compressor housing 3. As a rule, this sealing pack 12 comprises a number of axially successively arranged sealing rings, for example formed in a known manner from radially and/or tangentially cut or segmented packing rings, possibly in combination with support rings, each of which is situated in a chamber disk. The sealing pack 12 could also have an axial closure on an end face or on both sides, for example, in the form of an annular disk. Such sealing packs 12 of the piston rod 7 generally also include multiple axially successively arranged scraper rings. However, the scraper rings may also be situated in a separate scraper pack and separated from the sealing pack. These serve to prevent the lubricating oil used for lubricating the moving parts in the crankcase, in particular, the crankshaft 4 and the push rod 5, which adheres to the piston rod 7, from entering the cylinder 10. This serves to ensure that the compressed medium is not contaminated by lubricating oil, which is particularly important in natural gas compressors and air compressors, but also in dry-running compressors. Lubricating oil adhering to the piston rod 7 is scraped off by the scraper ring during the relative movement between the piston rod 7 and scraper rings. The scraped lubricating oil may then be collected and, if necessary, returned to the crankcase for lubrication. In order to improve this scraping action, a scraper ring 2 is provided according to the invention, which is described in greater detail in a preferred embodiment below with reference to FIG. 2.

Figure 2:
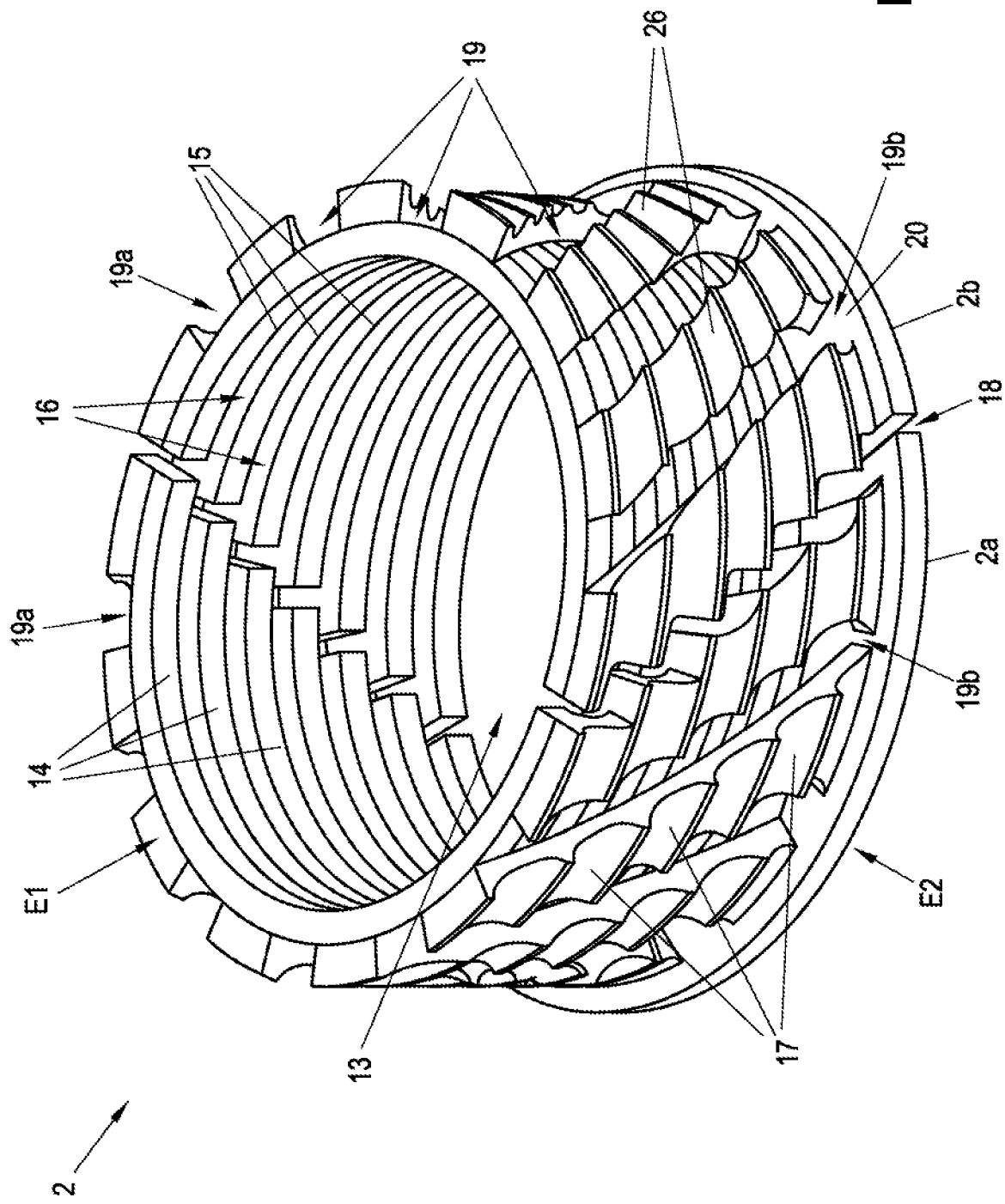
FIG. 2 shows a scraper ring of a preferred embodiment in an isometric view.

The scraper ring 2 in FIG. 2 includes a central cylindrical opening 13, in which in the mounted state, the piston rod 7, for example, the piston compressor 1, is fed through and which oscillates transitorily during operation. At least three sealing sections 14, each having a scraping edge 15 for scraping oil from the piston rod 7, are provided on the radially inner circumferential surface of the scraper ring 2. During use of the scraper ring 2, the scraping edges 15 generally face the oil-bearing side, here, for example, face the crankcase. The sealing sections 14 are spaced axially apart from each other by inner circumferential grooves 16. More than three sealing sections 14 may, of course, also be provided to improve the scraping effect, in the illustrated embodiment, the scraper ring 2, includes for example, seven sealing sections 14. It should be noted that an increase in the number of sealing sections 14 (having the same sealing section width b—see FIG. 4) also increases the axial length of the scraper ring 2. At least one outer circumferential groove 17 is provided on the radially outer circumferential surface of the scraper ring 2 in a known manner, which serves to receive an annular spring (not shown) for radially prestressing the scraper ring 2 on the piston rod 7. If multiple sealing sections 14 are provided on the scraper ring 2, as in the example shown, it is of course advantageous if the number of outer circumferential grooves 17 is increased accordingly, in order to be able to ensure a maximally uniform prestressing against the piston rod 7 over the axial length of the scraper ring 2. In the embodiment shown, for example, six outer circumferential grooves 17 are provided, though of course more or fewer could be provided. In the assembled state, a first axial ring end E1 of the scraper ring 2 faces the piston 8, which means that the scraper ring 2 is acted upon by lubricating oil from the opposite second axial ring end E2 during operation of the piston compressor 1, which adheres to the piston rod 7. Accordingly, the scraping edges 15 on the sealing sections 14 face the second axial ring end E2. In order to improve the scraping action, the sealing sections 14 may be variously configured to produce different scraping edges 15, as is explained later in detail with reference to FIG. 8.

Figure 4:
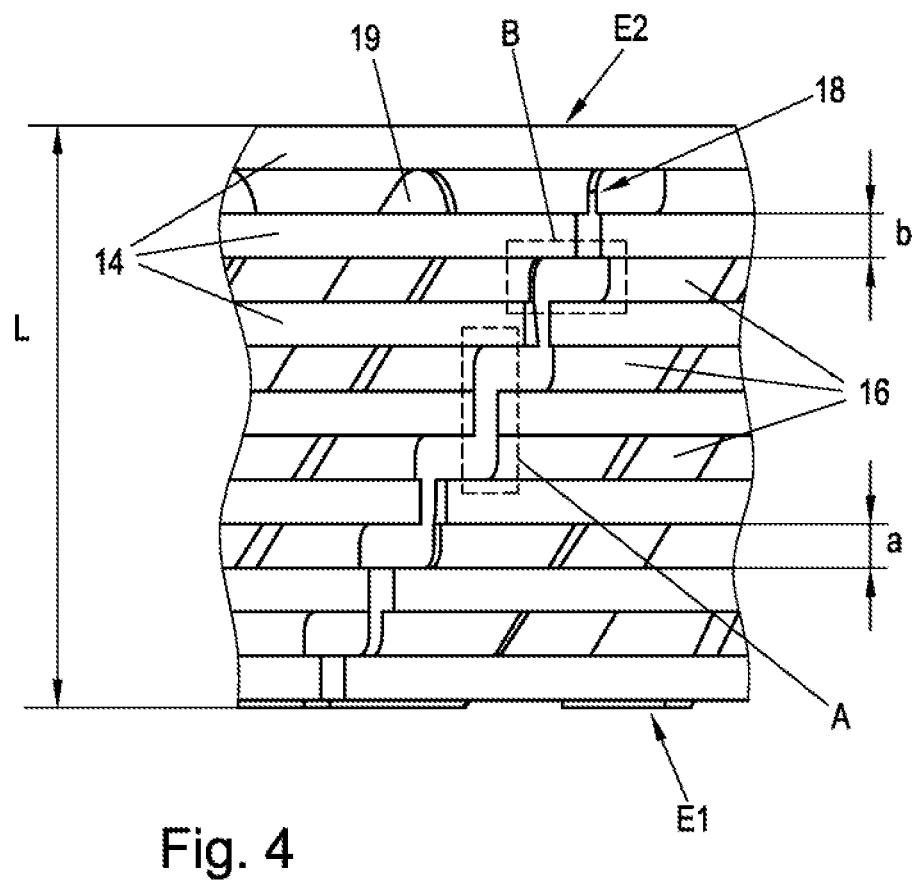
FIG. 4 shows a preferred embodiment of a recess of the scraper ring.

At least one recess 18 is provided according to the invention on the circumference of the scraper ring 2, which radially penetrates the scraper ring 2 and which extends at least partially from the first axial ring end E1 in the direction of the second axial ring end E2. The length of the recess 18 in this case is to be dimensioned so that a certain adjustability of the scraper ring 2 in the circumferential direction is ensured. This adjustability is important in that the scraper ring 2 in the mounted state is able to be prestressed radially against the piston rod 7 by the annular springs 21 situated circumferentially in the circumferential grooves 17, so that the scraper ring 2 is able to produce its scraping effect. For this purpose, the axial length of the recess 18 may be dimensioned so that the scraper ring 18 is able to deform as a result of the action of the annular springs 21, in order to be prestressed against the piston rod 7, at least in the region of the first axial ring end E1. Preferably, only a very small web remains on the second ring end E2, for example, in the region of the inner circumferential groove width a or sealing section width b (as indicated in FIG. 4, in which a continuous web is shown on the second ring end E2), so that the scraper ring 2 is sufficiently flexible.

In principle, a material with suitable strength properties may be used as the material for the scraper ring 2 which, on the one hand, allows a sufficiently high stability of the scraper ring and which, on the other hand, exhibits a certain elasticity to enable the adjustability of the scraper ring 2. In the case of a material with relatively high rigidity, for example, the recess 18 should extend farther from the first axial ring end E1 in the direction of the second axial ring end E2 than in the case of a relatively elastic material in order to ensure sufficient deformability of the scraper ring 2.

The recess 18 runs at least in sections in a direction deviating from the axial direction of the scraper ring 2, so that the sealing sections 14 at least partially overlap in the axial direction, thereby preventing scraped lubricating oil from flowing axially unimpeded through the recess 18, thereby improving the scraping effect.

According to one advantageous embodiment of the invention, the recess 18 extends, as shown in FIG. 2, though not only partially, but continuously from the first axial ring end E1 to the second axial ring end E2 of the scraper ring 2. As a result, the circumference of the scraper ring 2 is thus completely interrupted at least once (in the circumferential direction and radially). As a result, the adjustability of the scraper ring 2, in particular, is improved in the circumferential direction, as a result of which a very uniform prestressing of the scraper ring 2 in the axial direction is achieved by the annular springs 21. A uniform scraping effect is achieved as a result and a simple compensation for wear is also made possible. To facilitate the assembly of the scraper ring 2, multiple recesses 18 may be provided, which are preferably provided at constant angular distances spaced apart from each other on the circumference of the scraper ring 2. Two diametrically opposite recesses 18 are arranged in the example shown, resulting in two separate ring segments 2a, 2b.

To prevent the lubricating oil to be scraped from the piston rod 7 from flowing unimpeded in the axial direction through the recesses 18, which would reduce the scraping effect, it is provided that the direction of the recesses 18 deviates at least in sections from the axial direction (longitudinal axis) of the scraper ring 2. The two recesses 18 in the example shown extend helically along the outer circumferential surface of the scraper ring 2, wherein the pitch of the helix is preferably between 0.1 and 10, particularly preferably between 0.7 and 1.4. The helical profile has been found to be advantageous, but is not absolutely required. It is important only that the at least one recess 18 does not extend axially, at least in sections, so that in the axial direction, a certain overlap of the sealing sections 14, in particular, of the scraping edges 15 provided thereon, results.

Figure 5A:
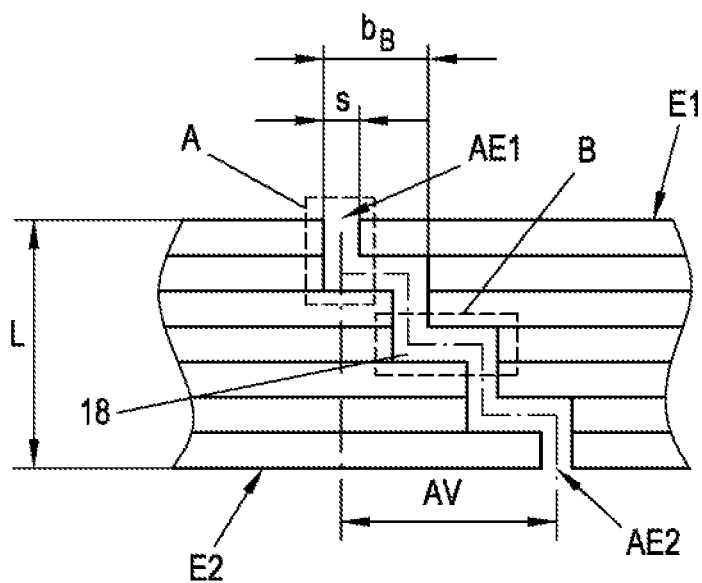
FIGS. 5A-5C show preferred embodiments of the recess of the scraper ring.
Figure 5B:
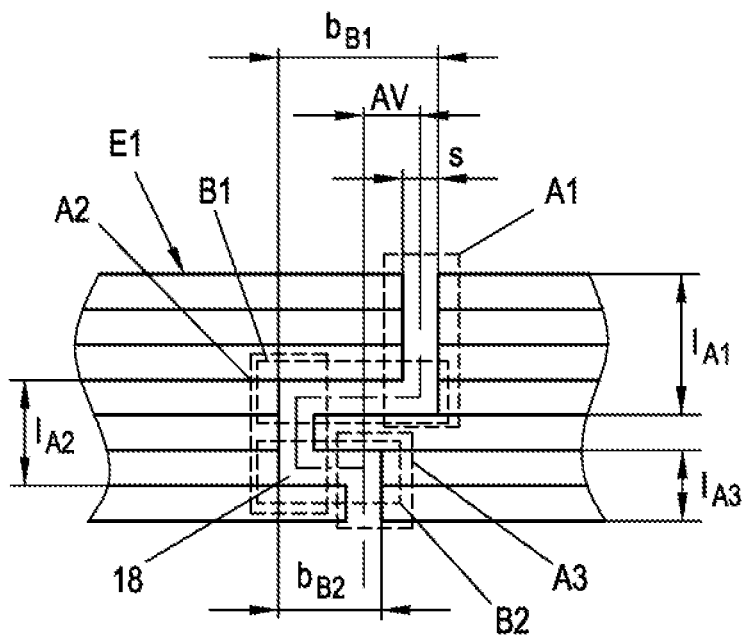
Figure 5C:
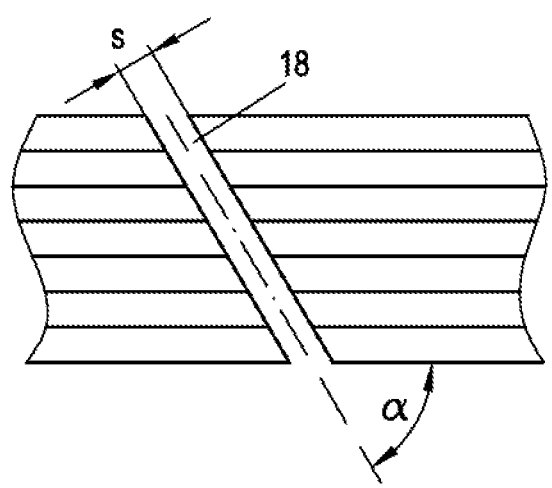

The recess 18 could, for example, also extend along a straight line from the first axial ring end E1 of the scraper ring 2 to the second axial ring end E2, which extends at a certain angle relative to the longitudinal axis of the scraper ring 2 (FIG. 5C). In order to further increase the blocking effect, i.e., the prevention of the unimpeded flow of lubricating oil from the first axial ring end E1 to the second axial ring end E2 of the scraper ring 2, it is advantageous if the at least one recess 18 extends in a stepped (FIG. 4+5A) or labyrinth-like manner (FIG. 5B), with alternating circumferential directions of the recess 18, wherein the stepped or labyrinth-shaped profile may also be combined with the helical or straight profile, as shown in FIG. 2 with reference to a stepped profile and is also explained in detail with reference to FIG. 4.

Provided on the outer circumferential surface of the scraper ring 2 are multiple drainage holes 19, which connect the inner circumferential grooves 16 to the outer circumferential surface of the scraper ring 2, in order to be able to remove scraped lubricating oil via the drainage holes 19. The drainage openings 19 may be variously designed, for example, as holes, grooves, etc.

In the illustrated preferred embodiment, the groove-shaped drainage openings 19 extend in the axial direction from the first axial ring end E1 of the scraper ring 2, in each case partially in the direction of the second axial end E2. The drainage holes 19 are connected to the inner circumferential grooves 16 by the groove-shaped drainage holes 19 intersecting the inner circumferential grooves 16. Ring sections 26, which are connected to the sealing sections 14, are each formed between the drainage openings 19 by the groove-shaped drainage openings 19. The ring sections 26 provide the scraper ring 2 the necessary stability and ensure that the position of the sealing sections 14 does not change in the axial direction and in the circumferential direction. This acts essentially analogous to an anti-rotation device, which was required till now in the prior art when multiple conventional scraper rings are used, and analogously to an axial fixation, which was previously achieved, for example, by means of support rings. The ring sections 26 may be connected to the circumferential shoulder 20 at the second axial ring end E2. The drainage openings 19 serve to remove lubricating oil scraped from the scraping edges 15 radially outwardly from the inner circumferential surface of the scraping ring 2 through the inner circumferential grooves 16. In order to make this possible, it is important that the drainage openings 19 extend only partially and not completely from the first axial ring end E1 of the scraper ring 2 to the second axial ring end E2. A radially outwardly extending circumferential shoulder 20 is provided on the scraper ring 2 in FIG. 2 on the second axial ring end E2, which axially delimits the drainage openings 19 and which may serve simultaneously to fix the axial position of the scraper ring 2. As shown in the illustrated example, the drainage openings 19, analogous to the at least one recess 18, may be provided, for example helically or straight on the outer peripheral surface of the scraper ring 2. Adjacent drainage openings 19 are preferably situated at constant angular distances from each other. Exceptions to this are therefore those drainage openings 19, between which the at least one recess 18 is located. These are the two drainage openings 19a and 19b in the exemplary embodiment shown. It is further advantageous if the drainage openings 19 extend in parallel to the at least one recess 18 in order to achieve the maximum uniform stability of the scraper ring 2.

Figure 3:
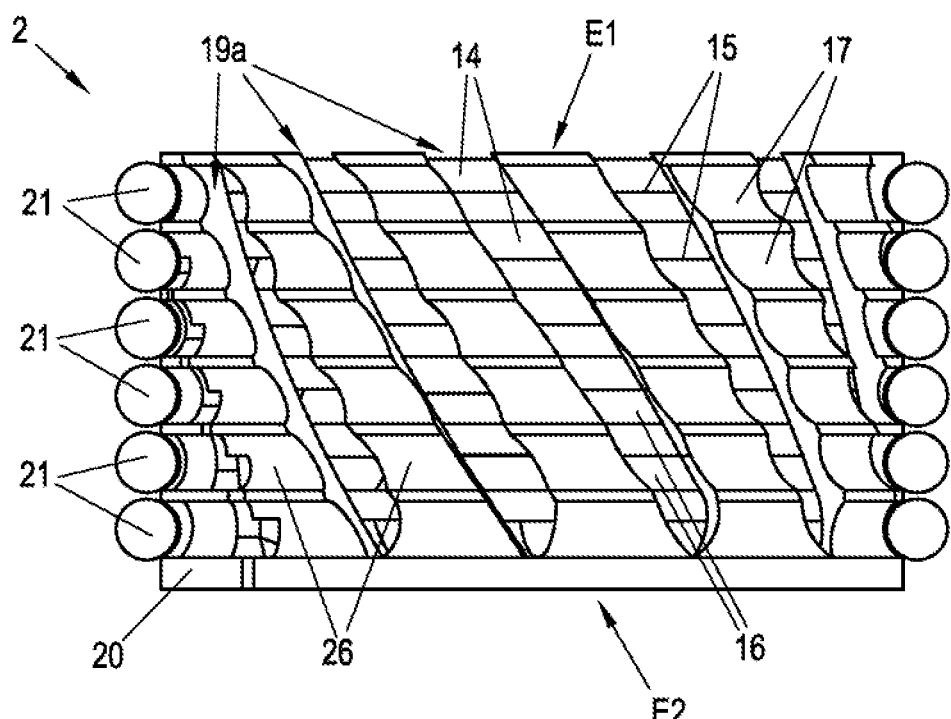
FIG. 3 shows a scraper ring of a preferred embodiment in a side view.

In FIG. 3, the scraper ring 2 shown in FIG. 2 is shown in a frontal view. Annular springs 21 are indicated here in the outer circumferential grooves 17, which press the scraper ring 2 radially against the piston rod 7 in the assembled state. Such annular springs 21 and their assembly are sufficiently well known, thus, will not be further discussed. It is apparent that the drainage openings 19 have a helical profile and extend from the first axial ring end E1 of the scraper ring 2 to the circumferential shoulder 20, which is provided on the second axial ring end E2. It is also evident that the drainage openings 19 intersect the inner circumferential grooves 16. The drainage openings 19 form the intermediate ring sections 26, which are connected radially inwardly to the sealing sections 14 in order to give the scraper ring 2 the necessary stability. The at least one recess 18 (not shown in FIG. 3) extends as previously described completely, and at least in sections in the non-axial direction, from the first axial ring end E1 to the second axial ring end E2 of the scraper ring 2. As a result, the scraper ring 2 is interrupted completely at least once on the circumference. In contrast to the recess 18, the drainage openings 19 could also have an axial profile, because they are delimited axially by the peripheral shoulder 20, as a result of which no lubricating oil is able reach the second axial ring end E2 of the scraper ring 2. However, the helical profile of the drainage openings 19 has proven to be advantageous, in particular, if the drainage openings 19 extend in parallel to the at least one recess 18. Also apparent in FIG. 3 are the sealing sections 14, which are spaced axially apart from each other by the inner circumferential grooves 16. The inner circumferential grooves 16, in turn, communicate with the drainage holes 19 in order to be able to transport the scraped lubricating oil radially outwardly. One advantage of these preferred groove-shaped drainage openings 19 is that a sufficiently large space for removing the lubricating oil is provided, so that an accumulation of lubricating oil between the piston rod 7 and scraper ring 2 may be reliably avoided, which potentially could negatively influence the scraping action of the scraper ring 2.

The scraper ring 2 may be manufactured, for example, via mechanical production, in particular machining, or via generative production methods, such as 3D printing, selective laser sintering or stereolithography, and is made preferably of a suitable, in particular tribologically optimized, plastic or also of metal. Such manufacturing methods are known in the art, for which reason they are not further discussed at this point. A combination of generative and machining production would, of course, also be conceivable. A base body of the scraper ring 2 could, for example, be manufactured by means of 3D printing, which includes essentially only the central cylindrical opening 13 and the sealing sections 14 spaced axially apart by the inner circumferential grooves 16. The desired number of drainage openings 19 and recesses 18 may be arranged in a second step, for example, by means of a suitable CNC milling process on the base body. If the scraper ring 2 has more than one recess 18, the resulting number of ring segments 2a-2i could, of course, be produced separately and joined only during assembly. The scraper ring 2 in the example shown in FIG. 2 includes two recesses 18, for example, and thus consists of two ring segments 2a, 2b. In the case of three recesses 18, it would accordingly be three ring segments 2a-2c, etc. The material used is preferably a tribologically optimized plastic, for example a PTFE-based plastic having suitable strength properties, the plastic should, in particular, also be temperature-resistant in order to withstand the temperatures expected during operation. The plastic should also be sufficiently resistant to the medium to be compressed and, in particular, to the lubricating oil to be scraped from the piston rod. It would, of course, also be conceivable for the scraper ring to be manufactured in sections from different materials, in particular from plastics, which have different properties. The sealing sections 14, in particular the scraping edges 15 could, for example, be made of a suitable relatively soft, elastic material so as not to damage the surface of the piston rod 7. The remaining scraper ring 2 could be made of a different material, for example, a more stable plastic or even a metal.

FIG. 4 shows a section of the scraper ring 2 in the region of a recess 18 in a frontal view. A drainage opening 19 provided on the radially opposite side of the scraper ring 2 is apparent in the background. The scraper ring 2 in the exemplary embodiment shown has seven sealing sections 14, which are spaced apart from one another in the axial direction by the inner circumferential grooves 16. More or fewer sealing sections 14 and inner circumferential grooves 16 could, of course, also be provided. It would be conceivable, for example, that with a constant axial height L of the scraper ring 2, the sealing section width b of the sealing sections 14 and the inner circumferential groove width a of the inner circumferential grooves 16 are changed, or that the sealing section width b of the sealing sections 14 and the inner circumferential groove width a of the inner circumferential grooves 16 are changed, causing the axial height L of the scraper ring 2 to change. The individual sealing sections 14 need also not have the same sealing section width b, nor must the individual inner circumferential grooves 16 have the same inner circumferential groove width a.

The recess 18 extends from the first axial ring end E1 to the second axial ring end E2 of the scraper ring 2 and in this case has a helical profile. In addition, the recess 18 has a stepped design, thus, starting from the first axial ring end E1, has (here) an axial recessed section A alternating with a recess section B (here) extending normally in the circumferential direction, as symbolized by the dashed regions in FIG. 4. The recess portions A, B need not, however, be normally situated on top of each other, but could for example also be situated at a certain angle to each other. The number n of axial recess sections A and number m of recess sections B may essentially be chosen in any manner and depends, for example, on the size of the scraper ring 2, on the nature of the lubricating oil, on the pressure conditions, etc. The number m of the recess sections B is generally m=n−1, wherein preferably at least n=2 axial recess sections A are arranged and consequently m=1 recess sections B. In addition to the helical and stepped profile of the recess 18, other profiles would of course also be conceivable, for example, a labyrinth-shaped profile (FIG. 5B) or a profile in the form of various curves. The structural configuration of the recess(es) 18 is preferably selected so that on the one hand, the flow of lubricating oil between the axial ends E1, E2 is reliably limited and on the other hand that a preferably simple and cost-effective production is made possible.

Additional advantageous profiles of the recess(es) 18 are schematically shown in FIGS. 5A-5C, wherein the profile in FIG. 5A corresponds essentially to the profile shown with reference to FIG. 4. The recess 18 has a recess width s in the circumferential direction, which is between 0 mm and 10 mm, preferably between 0.2 mm and 7 mm, particularly preferably between 0.4 mm and 3 mm. The recess width s in this case depends essentially on the size and on the field of use of the scraper ring 2, for example, on the diameter of the cylindrical opening 13 (which corresponds essentially to the diameter of the piston rod 7), on the axial height L, on the sealing section width b or on an expected viscosity of the lubricating oil. However, the recess width s need not be constant in any embodiment of the recess 18 over the entire length of the recess 18. The stepped recess 18 in FIG. 5A extends essentially continuously rising from the first axial ring end E1 to the second axial ring end E2. This means, that the steps formed by the axial recess sections A and the recess sections B normally situated thereon extending in the circumferential direction are uniformly arranged. The second recess end AE2 of the recess 18, which opens at the second axial ring end E2, is thus offset in the circumferential direction by a certain recess offset AV from the first recess end AE1, which opens into the first axial ring end E1. The width of the recessed sections B is constant here. In the example shown in FIG. 5A, the recess offset AV is consequently formed by the number m of recess sections B and the recess section width bB of a recess section B, wherein the recess section width bB in the illustrated example is constant (which does not necessarily have to be the case). For the recess offset AV of the stepped profile, $AV = m \cdot b_B$ in general applies.

The recess 18 in FIG. 5B has a so-called labyrinth-shaped profile, with n=3 axial recess sections A and m=2 recess sections B extending in the circumferential direction, wherein a larger number n, m of recess sections A, B may, of course, also be arranged. The labyrinth-shaped recess 18 in FIG. 5B, starting from the first axial end ring first E1, initially includes a first axial recess section A1 having a first recess section length $l_{A1}$ and followed by a first recess section B1 extending in the circumferential direction having a first recess section width $b_{B1}$. The first circumferential recess section B1 is followed by a second axial recess section A2 having a recess section length $l_{A2}$. This is followed by a second recess section B2 extending in the circumferential direction having a first recess section width $b_{B2}$, to which a third axial recess section A3 having a recess section length $l_{A3}$ is connected, which opens into the second axial ring end E2.

In contrast to the stepped profile extending continuously in the circumferential direction in FIG. 5A, the recess sections B2 extending in the circumferential direction extend at least partially alternatingly in opposite tangential directions. The recess offset AV in the example shown in FIG. 5B thus corresponds to the difference between the recess section widths $b_{B1}$, $b_{B2}$ of the two tangential recessed sections B1, B2 ($AV = b_{B1} - b_{B2}$). In general, for the recess offset AV of the labyrinth-shaped profile $AV = |\Sigma b_{Bi} - \Sigma b_{Bj}|$ with Bi=recess sections B1, B3, . . . Bi extending unevenly in the circumferential direction and Bj=circumferential recess sections B2, B4, . . . Bj evenly in the circumferential direction. It is also conceivable, of course, to combine the stepped profile and the labyrinth-shaped profile.

The recess 18 in FIG. 5C has a simple straight profile and is situated at a recess angle α relative to the circumferential direction. The recess angle α is between 5° and 85°. Preferably between 20° and 60°, particularly preferably between 24° and 52°.

Embodiments other than those shown in FIGS. 5A-5C for the profile of a recess 18 would, of course, also be possible.

Figure 6:
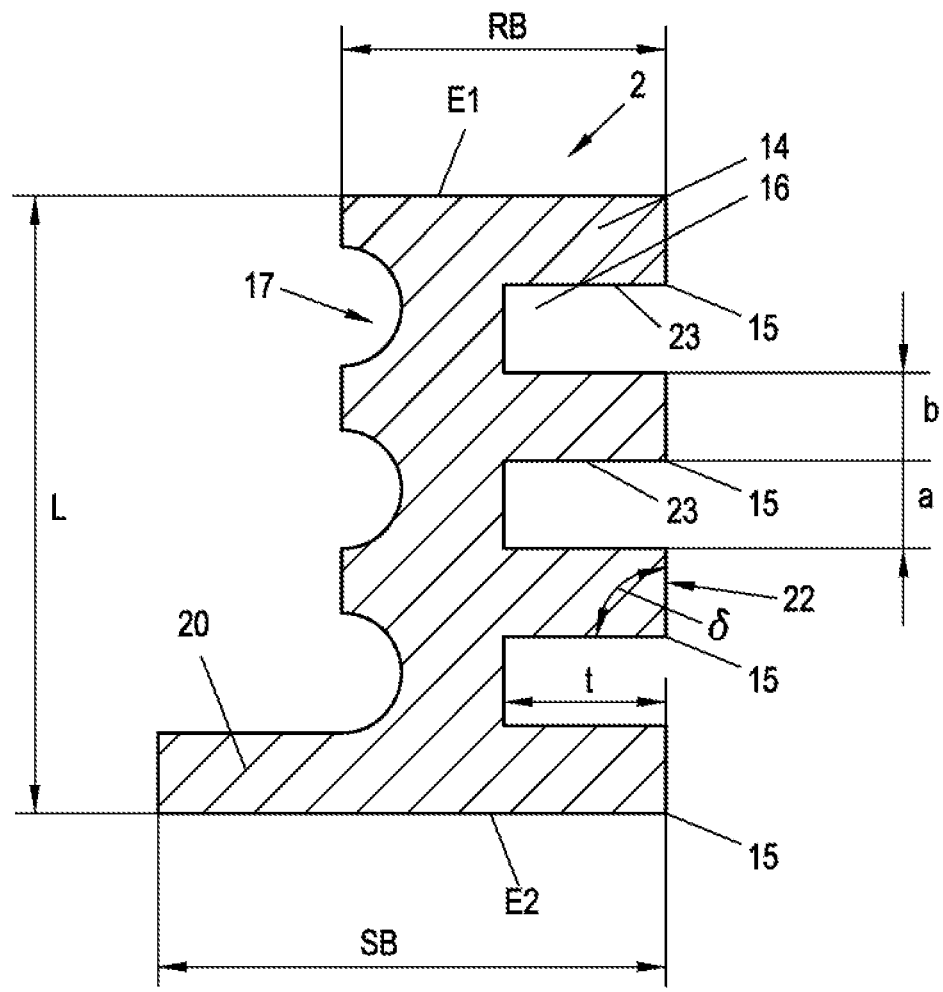
FIG. 6 shows a cross section of a scraper ring.

FIG. 6 shows a simplified cross-section of the scraper ring 2 at a point without recess 18 and drainage opening 19 and serves to illustrate the most important dimensions. The scraper ring 2 has an axial height L and a ring width RB on the first axial ring end E1. On the second axial ring end E2, the scraper ring 2 has an increased shoulder width SB compared to the ring width RB due to the circumferential shoulder 20. The scraper ring 2 has at least one outer circumferential groove 17, here three outer circumferential grooves 17, on the outer circumference for arranging an annular spring 21. The scraper ring 2 shown has four sealing sections 14 having a sealing section width b and three intermediate inner circumferential grooves 16 having an inner circumferential groove width a and an inner circumferential groove depth t.

Scraping edges 15 facing the second axial ring end E2 are provided on the sealing sections 14 for scraping lubricating oil. The inner circumferential grooves 16 and sealing sections 14 here have an essentially rectangular design. This means that a scraping angle δ is formed between the radially inner circumferential surfaces 22 of the sealing sections 14 and the first sealing sections surfaces 23 facing the second axial ring end E2, which corresponds here to an angle of 90°. The shape of the sealing sections 14 thus determines the shape of the inner circumferential grooves 16 and vice versa, and thus also the shape of the scraping edges 15. However, the scraping angle δ need not be a right angle, but various embodiments of the scraping edge 15 and consequently of the scraping angle δ are possible, as will be shown below with reference to FIGS. 8A-e.

Figure 7:
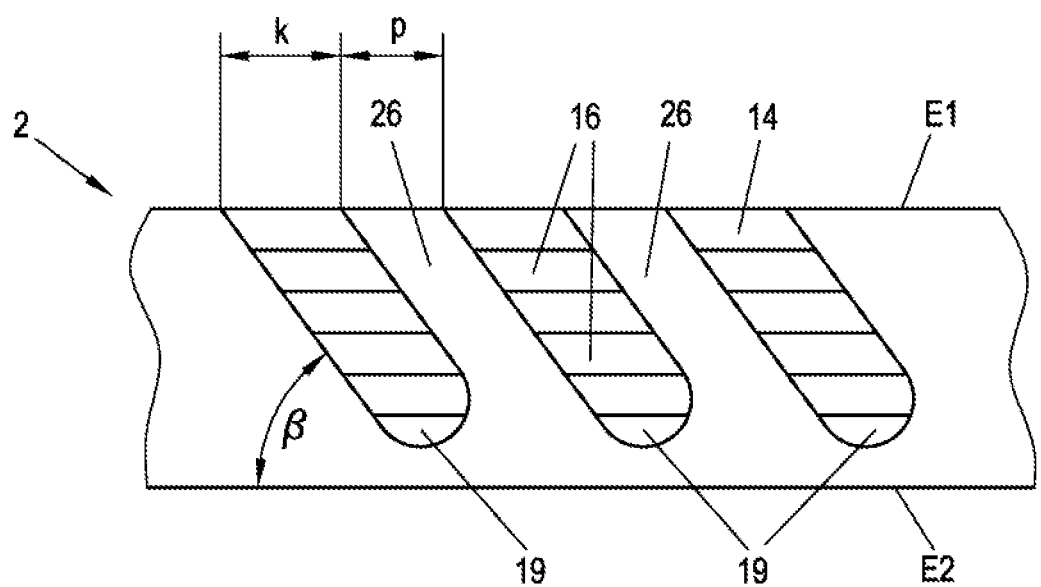
FIG. 7 shows a preferred embodiment of a drainage opening of the scraper ring.

FIG. 7 shows a schematic representation of advantageous drainage openings 19. The drainage openings 19, starting from the first axial ring end E1, extend partially in the direction of the second axial ring end E2 and are radially inwardly connected to the inner circumferential grooves 16 to remove scraped lubricating oil from the inside to radially outwardly. The ring sections 26, which are connected radially inwardly with the sealing sections 14, and are connected with the circumferential shoulder 20 on the second axial end of the ring E2, are formed between the drainage openings 19 to give the scraper ring 2 the necessary stability. At least one drainage opening 19 is provided on the scraper ring 2, but preferably multiple, in particular, at least seven drainage openings 19 are provided. The drainage openings 19 each have a drainage opening width k in the circumferential direction and are spaced circumferentially apart from each other at a drainage distance p. The ratio k/p of drainage width k to drainage distance p is preferably between k/p=0.1 and k/p=1.5, particularly preferably between 0.6 to 0.7, to ensure that sufficient ring material is provided between the drainage openings 19 to ensure a sufficiently high stability of the scraper ring 2. Other values for the ratio k/p may, of course also be provided depending on the material used. The drainage openings 19 may extend in the axial direction, preferably, however, they are situated at a certain drainage angle β relative to the circumferential direction, as is shown in FIG. 7. The drainage angle β is advantageously between 5° and 90°, preferably between 20° and 60°, particularly preferably between 24° and 52°. It is advantageous, in particular, if the drainage openings 19 extend in parallel to the at least one recess 18 in order to achieve a maximum uniform profile of ring material in the axial and tangential direction, which is advantageous for a uniform stability of the scraper ring 2.

Figure 8A:
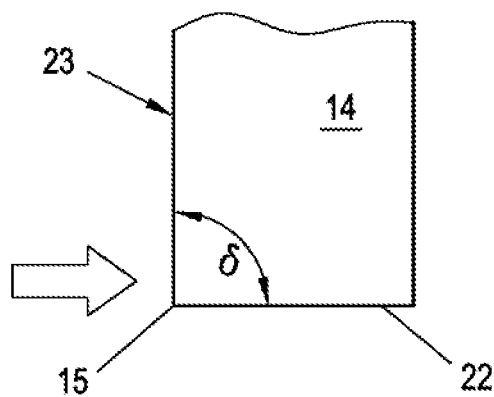
FIGS. 8A-E show different cross-sectional shapes of a sealing section with a scraping edge.
Figure 8B:
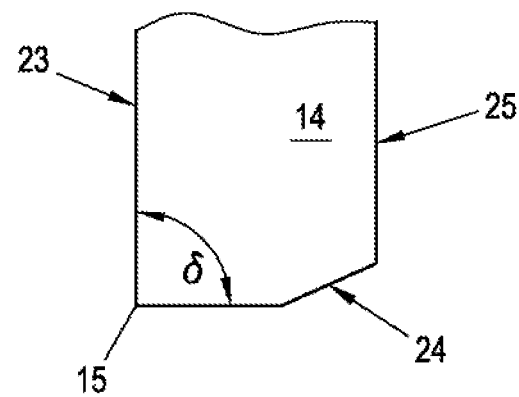
Figure 8C:
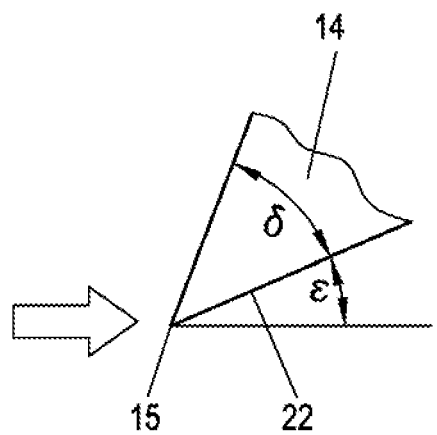
Figure 8D:
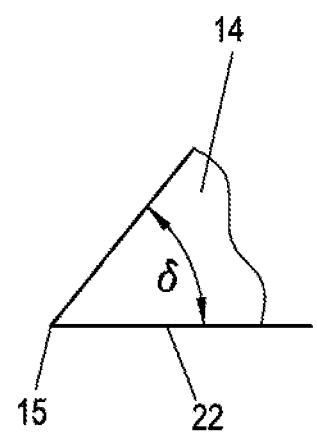
Figure 8E:
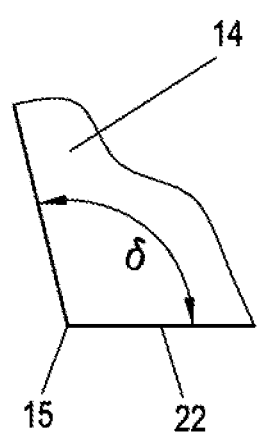

Finally, FIGS. 8A-e show several shapes of sealing sections 14 and the scraping edges 15 situated thereon. The arrow on the left symbolizes the direction from which the scraper ring 2 is acted upon by oil (the second axial ring end E2 in the embodiments shown thus far). The sealing section 14 in FIG. 8A corresponds essentially to the example shown in FIG. 6 with a scraping angle δ of 90°. The sealing section 14 in FIG. 8B also has a scraping angle δ of 90°, additionally, however a chamber 24 is provided between the radially inner circumferential surface 22 and a second sealing section surface 25 facing the first axial ring end E1 to improve the outflow of lubricating oil. FIGS. 8C-e show further embodiments of sealing sections 14 and, in particular, scraping edges 15 having different scraping angles S. In general, the scraping angle δ is in the range between 5° and 135°, preferably between 20° and 110°, particularly preferably between 30° and 100°. However, the radially inner circumferential surface 22 of a sealing section 14 need not necessarily extend in the axial direction, i.e., be cylindrical, but could, for example, be situated at a specific angle of inclination c relative to the axial direction, as is shown in FIG. 8C. Multiple different configurations of sealing sections 14 having different scraping edges 15, in particular scraping angles δ and angles of inclination ε, could, of course, also be combined on a scraper ring 2.

The exemplary embodiments of the scraper ring 2 shown with reference to FIGS. 2-8E are, of course, only to be understood as exemplary; the specific structural configuration is left to the person skilled in the art, since this depends on a large number of influencing parameters such as, for example, the lubricating oil used, the expected compression pressure of the compressor (or of the internal combustion engine), the expected temperature in the compressor housing (or motor housing), the size and surface condition of the piston rod 7, the compression medium used, etc.

The invention claimed is:

1. A scraper ring for scraping oil from a translationally oscillating piston rod, the scraper ring comprising:
    a radially outer circumferential surface including at least one outer circumferential groove that receives an annular spring configured and arranged to radially prestress the scraper ring;
    a radially inner circumferential surface including a plurality of sealing sections, each of the plurality of sealing sections including a scraping edge;
    a plurality of inner circumferential grooves that axially space apart adjacent sealing sections of the plurality of sealing sections;
    a first axial ring end;
    a second axial ring end;
    at least one recess radially penetrating the scraper ring is provided on a circumference of the scraper ring, the at least one recess extends at least partially from the first axial ring end of the scraper ring to the second axial ring end of the scraper ring, the at least one recess extends helically along the outer circumferential surface of the scraper ring, wherein the pitch of the helix is between 0.1 and 10, the at least one recess is configured and arranged to adjust the scraper ring in the circumferential direction, at least in the region of the plurality of sealing sections on the first axial ring end of the scraper ring, and wherein the at least one recess extends at least in sections in a direction deviating from an axial direction of the scraper ring; and
    at least two drainage openings are provided on the radially outer circumferential surface of the scraper ring, each of which extends helically and in the shape of a groove from the first axial ring end of said scraper ring partially in the direction of the second axial ring end, wherein each of the at least two drainage openings are connected to multiple inner circumferential grooves of the plurality of inner circumferential grooves, and are configured and arranged for removing scraped oil from the multiple inner circumferential grooves, and wherein the at least two drainage openings extend in parallel to the at least one recess.

2. The scraper ring according to claim 1, characterized in that the at least one recess extends continuously from the first axial ring end to the second axial ring end of the scraper ring, and wherein the scraper ring is completely interrupted at least once by the at least one recess.

3. The scraper ring according to claim 1, characterized in that at least one recess includes two recesses provided on the scraper ring.

4. The scraper ring according to claim 3, characterized in that the at least two recesses are provided at constant angular distances, spaced apart from each other on the circumference of the scraper ring.

5. The scraper ring according to claim 1, characterized in that:
- the at least one recess is stepped shaped,
- the at least one recess includes more than one step along the outer circumferential surface of the scraper ring,
- the at least one recess extends helically along the outer circumferential surface of the scraper ring, and wherein the pitch of the helix is between 0.1 and 10, and
- at least one of the two drainage openings extend helically.

6. The scraper ring according to claim 1, characterized in that the scraper ring is made at least partially of plastic.

7. The scraper ring according to claim 1, characterized in that the scraper ring is manufactured by means of a machining process and/or that the scraper ring is produced by means of a generative production process.

8. The scraper ring according to claim 4, characterized in that the at least one recess is stepped or labyrinth-shaped, wherein the recess includes at least three axially extending recessed sections and at least two circumferentially extending recessed sections, which are arranged alternatingly.

9. The scraper ring according to claim 1, characterized in that the at least two drainage openings include at least seven drainage openings.

10. The scraper ring according to claim 1, characterized in that the at least two drainage openings extend at a drainage angle $\beta$ with respect to a circumference of the scraper ring.

11. The scraper ring according to claim 10, wherein the drainage angle $\beta$ is in a range between 5° and 90°.

12. The scraper ring according to claim 10, wherein the drainage angle $\beta$ is in a range between 20° and 60°.

13. The scraper ring according to claim 10, wherein the drainage angle $\beta$ is in a range between 24° and 52°.

14. A sealing pack for sealing a translationally oscillating piston rod, the sealing pack comprising:
- a pack housing;
- a number of sealing rings arranged axially in succession, the sealing rings including at least one scraper ring configured and arranged for scraping oil from the piston rod, the at least one scraper ring including
  - a radially outer circumferential surface including at least one outer circumferential groove that receives an annular spring configured and arranged to radially prestress the scraper ring,
  - a radially inner circumferential surface including a plurality of sealing sections, each of the plurality of sealing sections including a scraping edge,
  - a plurality of inner circumferential grooves that axially space apart adjacent sealing sections of the plurality of sealing sections,
  - a first axial ring end,
  - a second axial ring end,
  - at least one recess radially penetrating the scraper ring is provided on a circumference of the scraper ring, the at least one recess extends at least partially from the first axial ring end of the scraper ring to the second axial ring end of the scraper ring, the at least one recess extends helically along the outer circumferential surface of the scraper ring, wherein the pitch of the helix is between 0.1 and 10, the at least one recess is configured and arranged to adjust the scraper ring in the circumferential direction, at least in the region of the plurality of sealing sections on the first axial ring end of the scraper ring, and wherein the at least one recess extends at least in sections in a direction deviating from an axial direction of the scraper ring, and
  - at least two drainage openings are provided on the radially outer circumferential surface of the scraper ring, each of which extends helically and in the shape of a groove from the first axial ring end of said scraper ring partially in the direction of the second axial ring end, wherein each of the at least two drainage openings are connected to multiple inner circumferential grooves of the plurality of inner circumferential grooves, and are configured and arranged for removing scraped oil from the multiple inner circumferential grooves, and wherein the at least two drainage openings extend in parallel to the at least one recess.

15. A piston compressor comprising:
- a compressor housing including
  - at least one cylinder housing situated therein, and
  - at least one scraper ring;
- a piston configured and arranged to oscillate translationally within the at least one cylinder housing;
- a piston rod connected to the piston; and
- wherein the at least one scraper ring is configured and arranged for scraping oil from the piston rod, the at least one scraper ring including
  - a radially outer circumferential surface including at least one outer circumferential groove that receives an annular spring configured and arranged to radially prestress the scraper ring,
  - a radially inner circumferential surface including a plurality of sealing sections, each of the plurality of sealing sections including a scraping edge,
  - a plurality of inner circumferential grooves that axially space apart adjacent sealing sections of the plurality of sealing sections,
  - a first axial ring end,
  - a second axial ring end,
  - at least one recess radially penetrating the scraper ring is provided on a circumference of the scraper ring, the at least one recess extends at least partially from the first axial ring end of the scraper ring to the second axial ring end of the scraper ring, the at least one recess extends helically along the outer circumferential surface of the scraper ring, wherein the pitch of the helix is between 0.1 and 10, the at least one recess is configured and arranged to adjust the scraper ring in the circumferential direction, at least in the region of the plurality of sealing sections on the first axial ring end of the scraper ring, and wherein the at least one recess extends at least in sections in a direction deviating from an axial direction of the scraper ring, and
  - at least two drainage openings are provided on the radially outer circumferential surface of the scraper ring, each of which extends helically and in the shape of a groove from the first axial ring end of said scraper ring partially in the direction of the second axial ring end, wherein each of the at least two drainage openings are connected to multiple inner circumferential grooves of the plurality of inner circumferential grooves, and are configured and arranged for removing scraped oil from the inner circumferential grooves, and wherein the at least two drainage openings extend in parallel to the at least one recess.

16. The piston compressor according to claim 15, wherein the compressor housing further includes a sealing pack having a pack housing in which a number of sealing rings are arranged axially in succession; and wherein the at least one scraper ring is further situated in the sealing pack.

\* \* \* \* \*